United States Patent Office 3,228,530
Patented Jan. 11, 1966

1

3,228,530
DISTRIBUTION MEANS FOR SEPARATION AND
CLARIFICATION TANKS
Gilbert W. Quast, Brookfield, and Anthony Geinopolos,
Milwaukee, Wis., assignors to Rex Chainbelt Inc., Milwaukee, Wis., a corporation of Wisconsin
Original application Nov. 14, 1960, Ser. No. 69,000.
Divided and this application Feb. 1, 1965, Ser. No.
431,761
1 Claim. (Cl. 210—519)

This application is a division of application Serial No. 69,000 filed November 14, 1960, and now abandoned.

This invention relates to settling tanks particularly of the type shown in United States Letters Patent No. 2,961,099 of Arthur C. Lind and William J. Katz, for Apparatus for Separation of Liquids or Solids From a Liquid.

In the type of tank referred to, a cylindrical skirt is supported within the tank and is uniformly spaced from the outer wall of the tank. The skirt together with the wall of the tank form the sides of an upper, annular feed channel opening upwardly and of a lower annular distribution zone opening downwardly into the tank. A horizontal member connecting the wall of the tank and the skirt for the support of the latter, forms the floor of the channel and defines the upper end of the distribution chamber. The feed is introduced into one end of the channel to flow toward the other end thereof until reaching one of a series of ports formed in the floor of the channel and opening into the annular chamber. The floor of the channel slopes upwardly from the influent end so that the channel has a diminishing cross-section providing a substantially uniform velocity of flow throughout the length thereof. The bottom of the skirt is uniformly spaced a selected distance from the floor of the tank so that the flow from the annular distribution chamber and into the tank at maximum flow rates does not wash or scour any given area of the tank.

The present invention particularly relates to large settling or liquid clarification tanks for sewage treatment and of which many are over one hundred feet in diameter so that the influent must be distributed uniformly throughout the periphery of the tank or over an area three hundred feet or more in length.

Such distribution is determined by a series of ports through which the influent passes from the channel into the distribution zone in which the submerged jets from the ports expand and merge at their borders before entering the tank, at rates for each port determined by the effective hydraulic head over the port.

An object of the present invention is to increase the maximum allowable spacing of the ports and also to increase the allowable size of the ports.

Sewage treatment tanks require ports in the order of three inches in diameter and spaced about two and one-half feet apart and the present invention makes possible even larger ports and larger spacing in such tanks. However, it is important to understand that no improvement is had by reason of the larger ports if the baffle means is itself subject to clogging by rags, sticks and leaves, for example.

The baffle means of the present invention requires no flow restrictions less than the diameter of the ports and is disposed with respect to the port so that it is washed or scoured at all times of debris and is set so that any rags that might be draped over the baffle will also be washed off. The invention provides a baffle disposed beneath the portion and a forward or support baffle which is sized and disposed so that one-half of the flow is diverted rearwardly referring to the flow in the channel or circumferentially of the tank.

2

According to the present invention, the downward jet from each port is thus spread along the underside of the channel in both directions circumferentially of the tank before substantial movement downwardly. The accumulation of floating material beneath the channel is prevented by the flow at the top of the distribution zone and the distribution zone itself is thus effective over its entire height or depth for the dissipation of the eddy currents in the flow before the flow passes into the tank.

The drawings furnished herewith illustrate the best mode of carrying out the invention as presently contemplated and set forth hereinafter.

Figure 1:
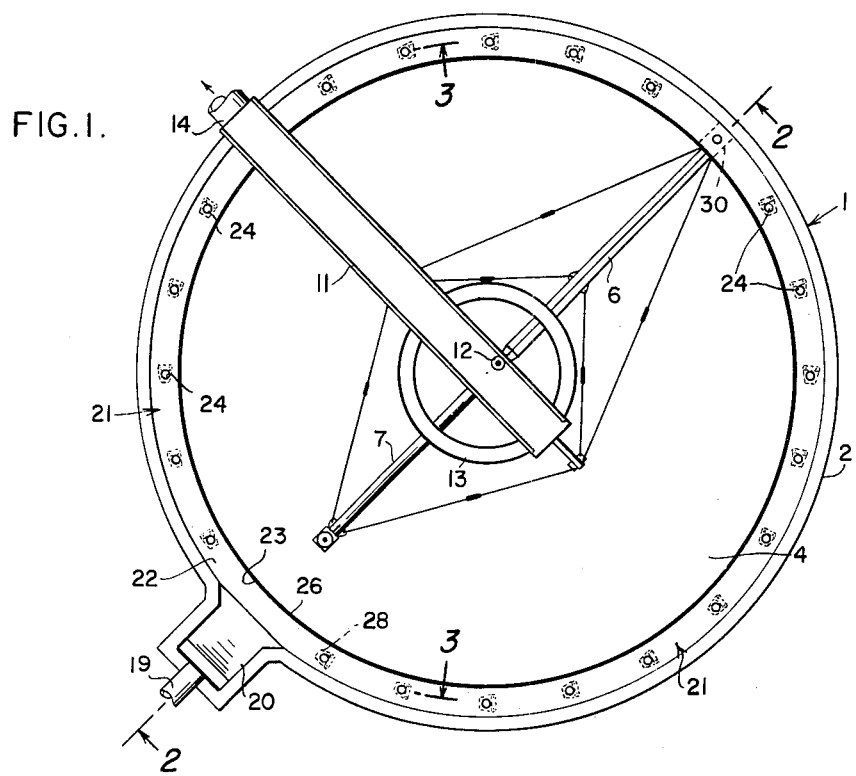
FIGURE 1 is a plan view of a circular settling tank with a rotating header for hydraulic removal of the settled solids and feed channels extending around both sides of the tank from a single inlet box.
Figure 2:
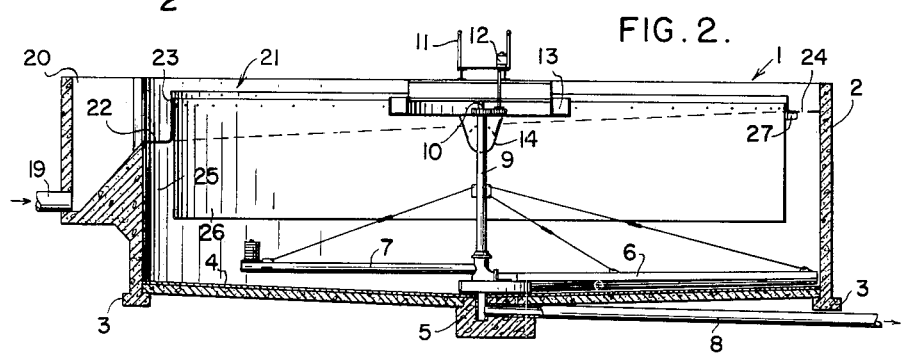
FIG. 2 is a vertical section through the center of the tank and taken on line 2—2 of FIGURE 1.
Figure 3:
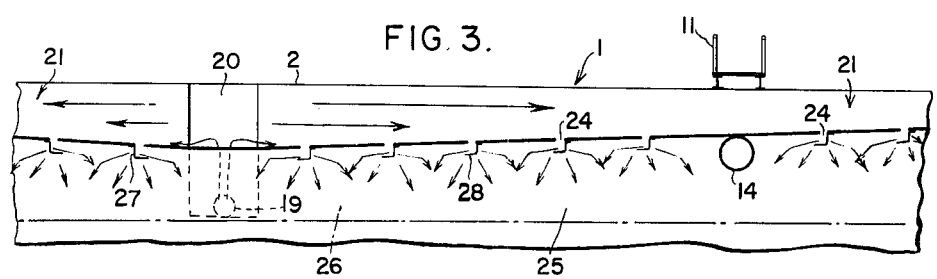
FIG. 3 is a vertical section taken on line 3—3 of FIGURE 1 which extends through part of one of the series of ports of one of the feed channels and at the centerline thereof. Because of the reduced scale the structural ports in section are shown by solid lines.
Figure 4:
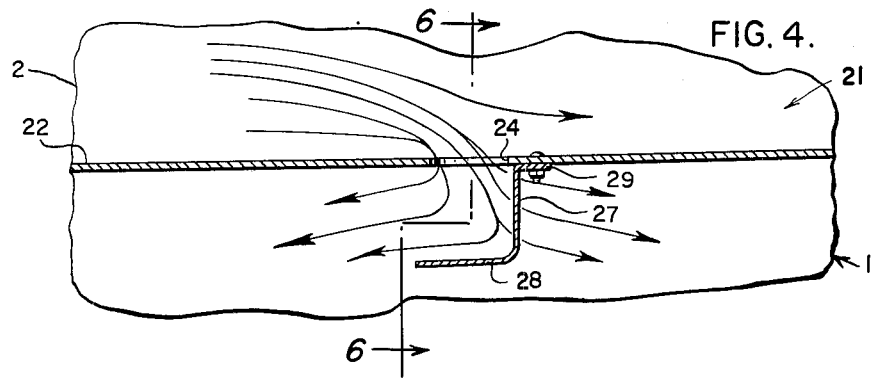
FIG. 4 is an enlarged vertical section through one of the ports and showing the baffle means in side elevation and its position with respect to the port.
Figure 5:
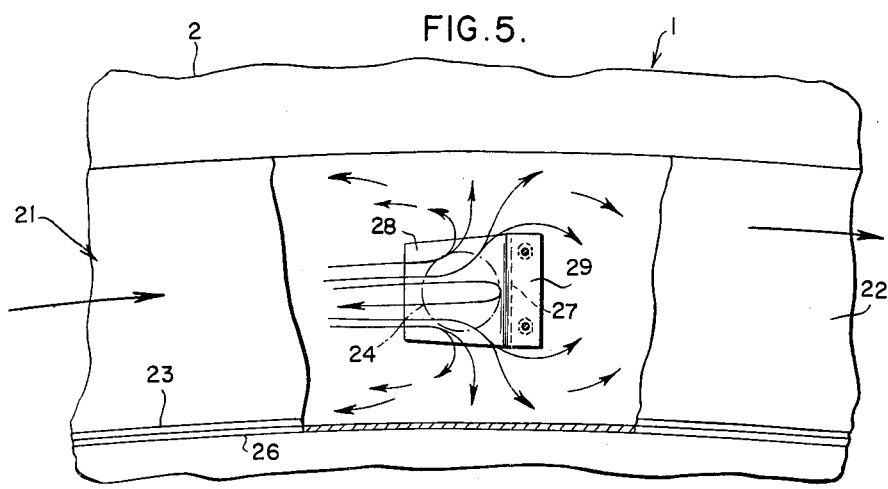
FIG. 5 is an enlarged plan view of a section of the feed channel with part of the floor removed to show the position of the baffle means in plan. The location of the port above the baffle means is shown in broken lines.
Figure 6:
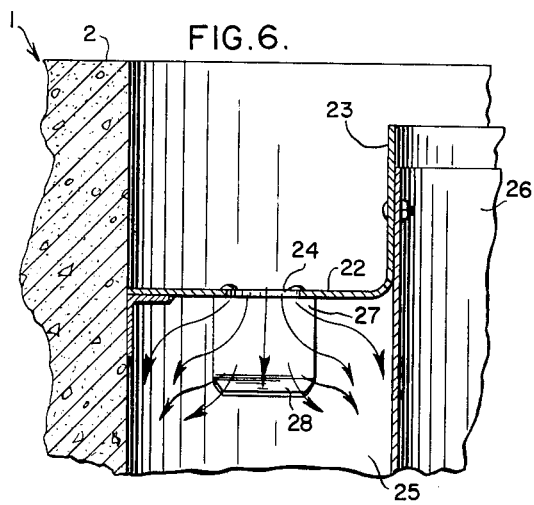
FIG. 6 is a cross-section of the feed channel and upper part of the distribution zone taken on line 6—6 of FIG. 4.

The tank 1 of concrete construction as shown in the drawings, includes the circular wall 2 supported on the footings 3 and the floor 4 forming the tank bottom which slopes slightly downwardly toward the concrete center base 5.

The material settled on floor 4 may be variously removed as by scraper means not shown, or hydraulically by the eduction header 6 which is supported with and opposite the counterweighted arm 7 on base 5. The pipe 8 beneath tank 1 is connected to header 6 for removal of the settled material as the header is moved about the tank by the vertical drive tube 9.

The center column 10 extending from base 5 and through tube 9 supports the end of the bridge 11 and carries the motor and gear mechanism 12 which drives tube 9 to move header 6. The end of bridge 11 at the center of the tank also supports the annular effluent trough 13 at a given height which determines the liquid level maintained within the tank.

The discharge pipe 14 connected to effluent trough 13 is supported by and below bridge 11 and extends through the wall 2 of tank 1 where the bridge at the side of the tank rests on the wall 2.

The influent pipe 19 for delivery of the feed to the tank is connected to the feed box 20 which is of concrete construction integral with the sidewall 2 of the tank. Box 20 opens into the deeper ends of the two feed channels 21 which extend oppositely around the tank to a point opposite box 20. Each channel is of diminishing cross-section to maintain a given substantially uniform velocity in the channel as described in said United States Letters Patent No 2,961,099 in order to keep the solids from settling out along the length of the channel but without an excessive velocity which involves a loss of head and energy and adversely affects the equal distribution provided by the ports.

Both the floor 22 and inner sidewall 23 of each channel as shown are of metal construction while the upper part of the concrete sidewall 2 of the tank forms the outer sidewall of the channels. The feed from each channel 21 passes through the series of ports 24 in floor 22 to enter the annular distribution zone 25 located beneath the feed channels and between sidewall 22 of the tank and the annular skirt 26. Skirt 26 is of metal and is supported at its upper end from the sidewalls 23 of the channels 21.

Skirt 26 is equally spaced from sidewall 2 and also from floor 4 of the tank at certain distances. The distance from sidewall 2 is conveniently that of the width of channels 21 but could be greater or less if necessary. This, so far, has been found to be unnecessary because of the flexibility of design which is afforded by the invention of United States Letters Patent No. 2,961,099 referred to and the present invention. The distance from floor 4 to the bottom edge of the skirt should be enough so that the flow entering the tank does not disturb the settled solids but therefore otherwise should be as low as possible inasmuch as settling of the solids on floor 4 is the function of the tank. However, the efficiency of hydraulic removal devices such as that shown in the drawings requires that the solids by evenly distributed over the floor of the tank rather than settled out as soon and as near the inlet as possible.

According to the present invention, a baffle and support is provided at each port for both channels and are disposed according to the direction of flow in the respective channel. The vertical support baffle 27 extends downwardly from channel floor 22 at the downstream side of each port 24 referring to the direction of channel flow and supports a horizontal baffle 28 located beneath the port. The flange 29 integral with support baffle 27 at the top thereof allows each baffle to be bolted or welded to the underside of floor 22.

Baffle 28 and particularly support baffle 27 are dimensioned so that approximately one-half of the flow is reversed in direction, referring to the channel flow, and so that the distribution of the flow in zone 25 is symmetrical about a vertical axis through the centerline of the respective port.

An important dimension in accomplishing this distribution is also the width or space between support baffle 27 and skirt 26 on one side and wall 2 of the tank on the other side of the support which allows a certain amount of the flow to move along the wall and skirt without much change of direction and to offset the flow which sweeps downwardly and rearwardly over support baffle 27 and baffle 28 is then reversed.

According to the invention, the latter flow also serves to keep the support baffle and other baffle free of rags and debris. For that purpose the corner between support baffle 27 and baffle 28 may be well rounded and the width of support baffle 27 and baffle 28 diminishes toward the free unsupported end of baffle 28 so that any rags draped thereover will be pushed off by the reversed flow.

As stated above, the baffles involve no restrictions less than the diameter of the port. That is, baffle 28 may be located anywhere between one and two port diameters below the port. In case the distribution zone 25 is not as wide as shown, there may appear to be a restriction between the support and baffle and skirt 26 and wall 2 of the tank. However, this passageway enlarges in the downward direction because of the tapered baffle and support and particularly is unclosed at the lower end so that it is not subject to clogging in any case.

The wide distribution of the flow from each port may easily extend three to four feet in each direction toward each adjacent port. Further distribution of the flow is effected as the flow moves downwardly in zone 25 so that the ports may easily be to eight feet apart in tanks of the type referred to with the desired uniform and continuous velocity front entering the tank below skirt 26.

Because of the equalization of the flow provided, the ports immediate to the feed box 20 at the inlet ends of the channels 21 may be further spaced as shown and if necessary to avoid the turbulence of the flow entering the channels. Similarly, the ports on either side of discharge pipe 14 may be spaced where necessary to avoid interference of the pipe with the jets from the adjacent ports.

As shown in FIGURE 1, the port at the joined, shallow ends of the channels 21 may be provided only with the horizontal baffle 30 extending from wall 2 of skirt 26. The baffle 28 with support baffle 27 of the present invention is not here required for the reason that the flow approaches the port from both directions and no part of the flow needs to be reversed as described.

As to all the other ports, however, the amount of the flow to be reversed, depends upon the amount of horizontal velocity energy carried by the flow through the ports. This energy is directly indicated by the angularity of the jet respecting the vertical and where the channel floor is of steel construction, a considerable portion of this energy is carried through the ports.

Various modes of carrying out the invention are contemplated as within the scope of the following claim particularly pointing out and distinctly claiming subject matter which is regarded as the invention.

We claim:

In a tank for the gravity-separation of solids from a liquid, said tank having a bottom and a sidewall, inlet means in said tank for introducing liquid to be treated, a skirt spaced from said bottom and from said sidewall, said tank further having a floor extending below said inlet means and between said sidewall and skirt, said floor being provided with a series of ports spaced from one another and each being located approximately midway between said sidewall and skirt, said ports having a downward length the same as the thickness of said floor, said floor and the portions of said sidewall and skirt below said floor defining a distribution zone which opens downwardly and into the tank beneath the lower edge of the skirt, said floor and the portions of said sidewall and skirt above said floor defining a relatively high velocity feed-channel extending circumferentially of the tank in one direction from said inlet means, said inlet means being in communication with said feed channel; baffle means provided each port comprising an imperforate support baffle extending downwardly from said floor within the distribution zone at the downstream side of each port, said support baffle extending substantially parallel to a plane of the vertical cross section of the feed channel, and a generally horizontal imperforate baffle carried by said support baffle and extending therefrom beneath the port, said baffle means extending in a direction opposite to the direction of flow in said feed channel and toward said inlet means, the spacing between said floor and the horizontal baffle, and the spacing between said baffle means and the sidewall and skirt of the tank respectively being generally not less than the diameter of the port to assure that said baffle means will not materially cause the port to become clogged, said baffle means being of a width approximately equal to the diameter of the port, and means including outlet means within said skirt for withdrawing clarified effluent from said tank.

References Cited by the Examiner

UNITED STATES PATENTS

| | | | |
|---|---|---|---|
| 2,064,792 | 12/1936 | Fischer | 210—525 |
| 2,267,516 | 12/1941 | Adams | 210—520 X |
| 2,961,099 | 11/1960 | Lind et al. | 210—519 |
| 2,961,100 | 11/1960 | Katz et al. | 210—519 |

FOREIGN PATENTS 534,684   3/1941   Great Britain.

REUBEN FRIEDMAN, *Primary Examiner.*